Nov. 25, 1930.　　F. NEUSCHAFER ET AL　　1,782,511
CARBONATING MACHINE
Filed Jan. 29, 1929　　3 Sheets-Sheet 2

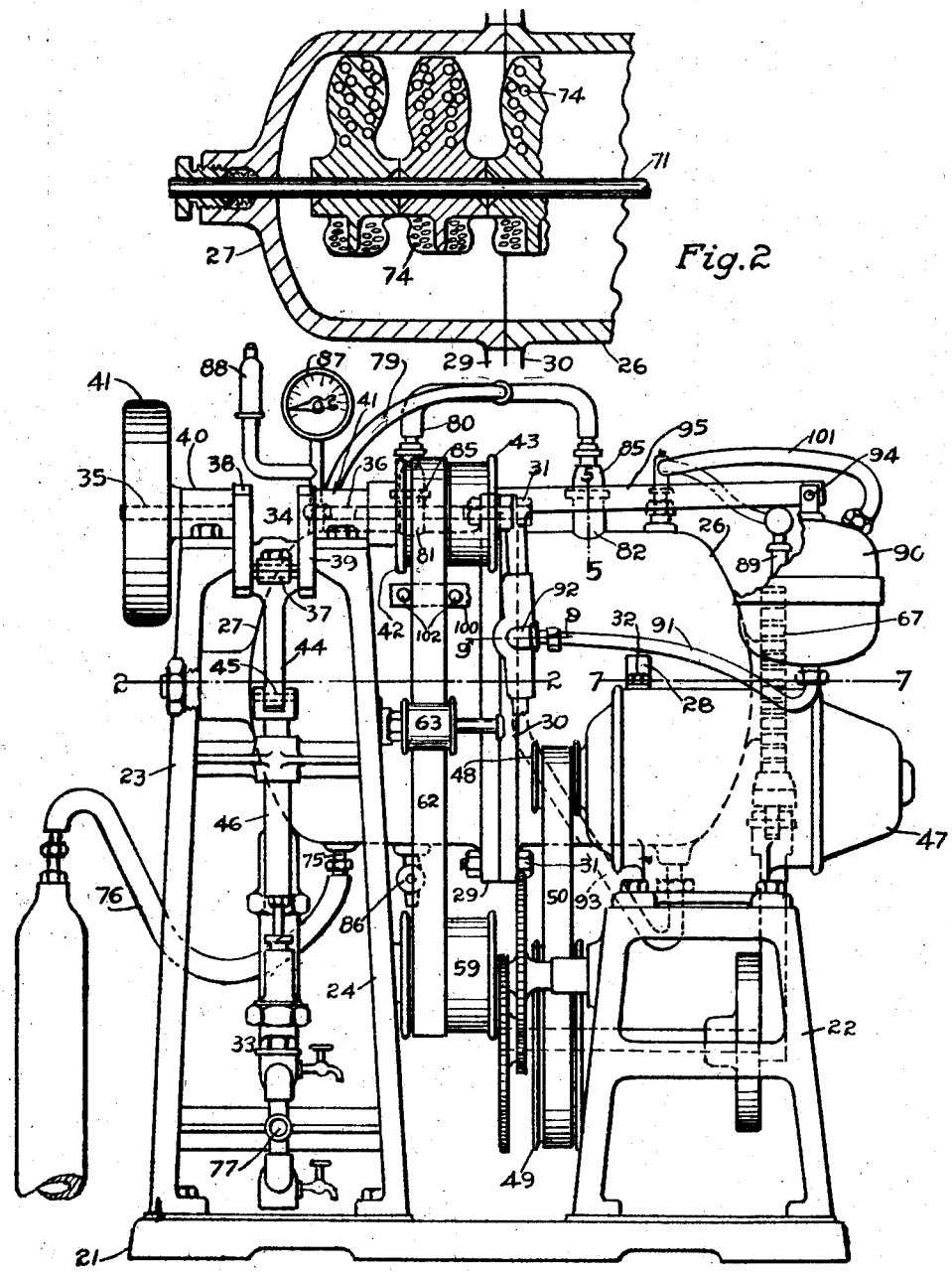

INVENTORS
Frederick Neuschafer
Harry Boxum
BY
Baruch Shertz
ATTORNEY

Nov. 25, 1930.  F. NEUSCHAFER ET AL  1,782,511
CARBONATING MACHINE
Filed Jan. 29, 1929  3 Sheets-Sheet 3
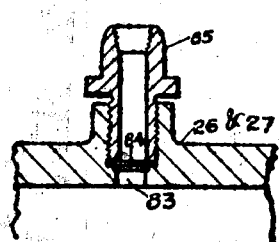
Fig. 5
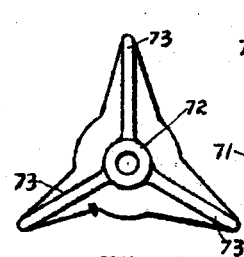
Fig. 6
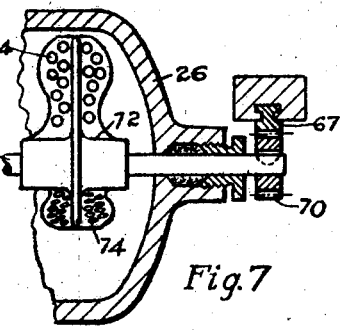
Fig. 7
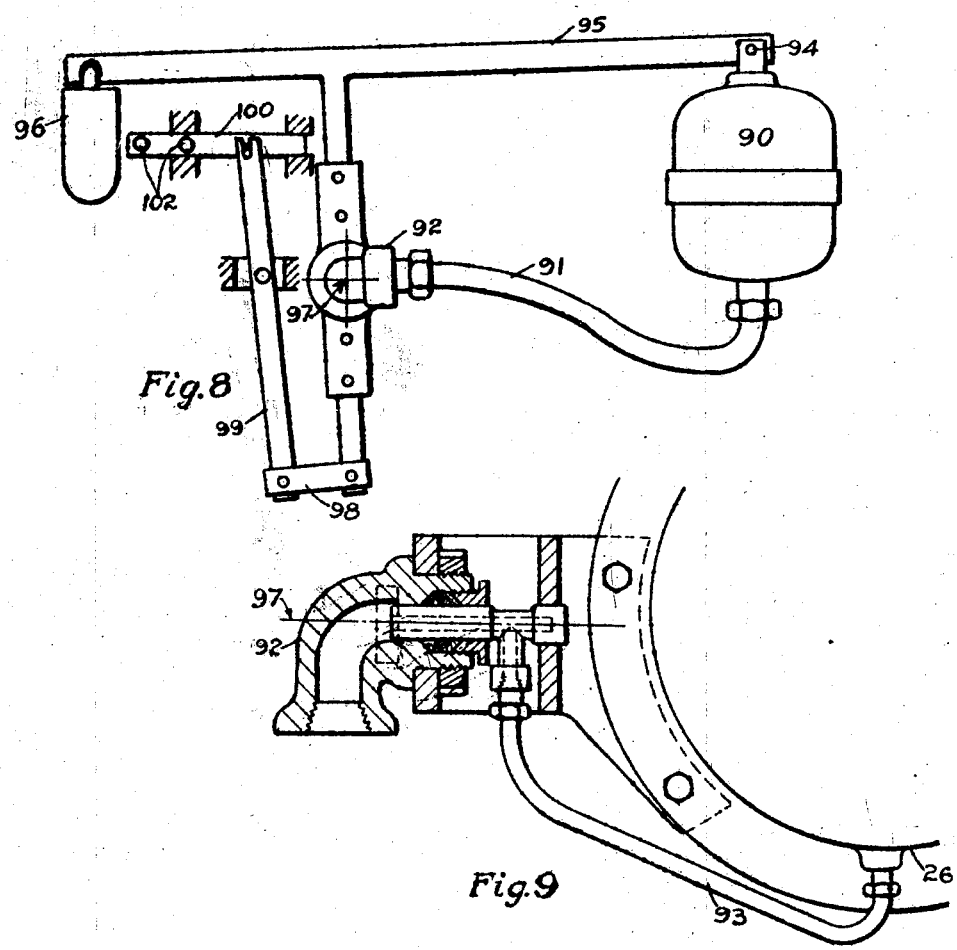
Fig. 8
Fig. 9
INVENTORS
Frederich Neuschafer
Harry Batwin
BY
Baruch Spector
ATTORNEY Patented Nov. 25, 1930

1,782,511

UNITED STATES PATENT OFFICE

FREDERICK NEUSCHAFER, OF JERSEY CITY, NEW JERSEY, AND HARRY BOTWIN, OF BROOKLYN, NEW YORK

CARBONATING MACHINE

Application filed January 29, 1929. Serial No. 335,818.

This invention relates to improvements in carbonating machines for the manufacturing of carbonated water.

Heretofore, machines of this character have been provided with a mixing tank in which gas and water are introduced and agitated by the action of a rotatable agitator, the same being turnable in one direction only and which does not thoroughly mix the carbonated gas and water, while we aim to impart reverse rotation to the agitator to assure a thorough mixing of the elements under comparatively low pressure.

Another object of the invention is to provide a carbonating machine in which the water level in the mixing tank automatically controls the pumping of water to the tank, but which does not interfere with the operation of the agitator, although both the pump and the agitator receive their power from a common source.

A further object is to eliminate the use of rubber hose between the liquid level controlling vessel and the connection with the source of liquid supply, as it has been proven that by reason of constant flexure of the hose, the same tends to weaken and also the passage of water therethrough induces deterioration and unpleasant odors which might contaminate the carbonated water produced by the machine.

A still further object is to provide a carbonating machine which is simple of construction, automatic in operation, and strong and durable for the purpose intended.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a front elevational view of our improved carbonating machine.

Figure 2 is a fragmentary horizontal sectional view through the mixing tank taken on the line 2—2 of Figure 1.

Figure 5 is a detail vertical longitudinal sectional view on the line 5—5 of Figure 1.

Figure 6 is a detail elevational view of one of the agitating paddles.

Figure 7 is a fragmentary horizontal sectional view on the line 7—7 of Figure 1.

Figure 8 is a side elevational view of the automatic pump belt shifting mechanism.

Figure 9 is an enlarged detail horizontal sectional view on the line 9—9 of Figure 1.

Figure 4:
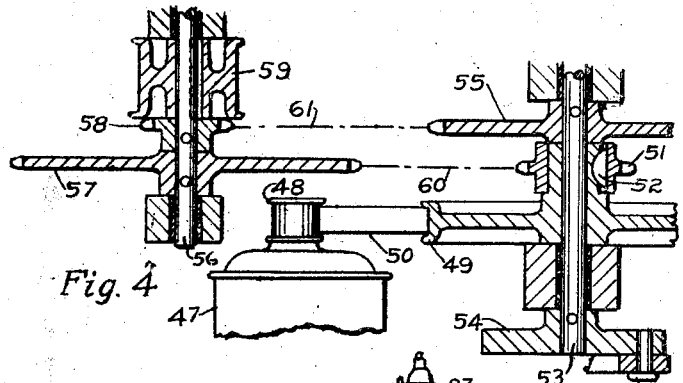
Figure 4 is a fragmentary horizontal sectional view on the line 4—4 of Figure 3.

Referring to the drawings by reference characters, the numeral 21 designates the base of our improved carbonating machine which has mounted thereon a frame 22 supported by legs 23 and 24 together with a pair of water tank supporting frames 25 mounted adjacent the frame 22. The general configuration of the frame 25 is clearly shown in Figure 3 of the drawings, and serves to support certain parts to be hereinafter explained. The mixing tank is constructed of two sections 26 and 27 which rest in seats provided in the frames 25 and secured thereto by four lugs 28 bolted to the frame and riveted as at 32 or otherwise secured to the mixing tank section. The meeting ends of the two tank sections 26 and 27 are provided with flanges 29 and 30, respectively, which are fixedly connected together by a plurality of bolts or like fastening elements 31.

Figure 3:
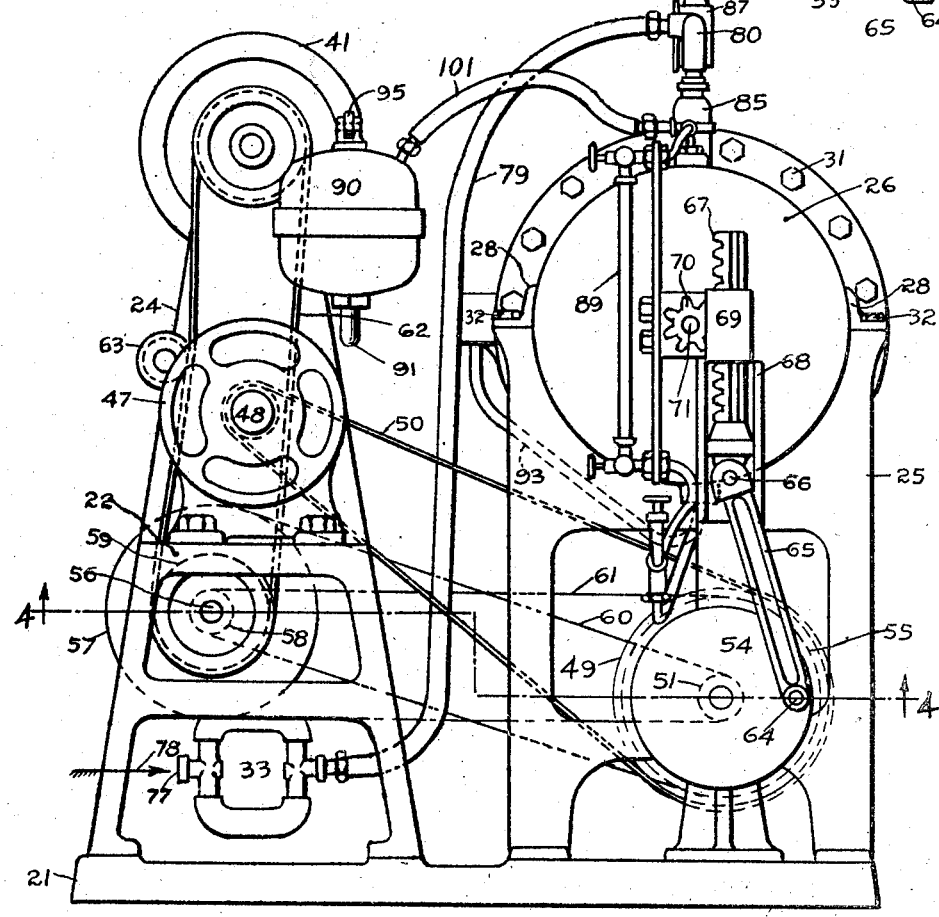
Figure 3 is a side elevational view of the machine.

The numeral 33 designates a double acting water pump best shown in Figures 1 and 3 of the drawings, and which pump is operable by a double acting crank 34 as best seen in Figure 1 of the drawings. Axially alined crank shafts 35 and 36 are mounted in bearings at the top of the frame 23, while a crank pin 37 is fixedly connected to the crank arms 38 and 39 respectively connected to the crank shafts 35 and 36. The bearings in which the shafts 35 and 36 are mounted are indicated by the reference characters 40 and 41, respectively.

Fixed to the outer ends of the crank shaft 35 is a fly wheel 41', while fixed to the outer end of the crank shaft 36 is a pulley wheel 42, on which crank shaft a loose or idle pulley 43 is also mounted. The crank pin 37 is mounted within a bearing at the top of a connecting rod 44, while the bearing 45 at the other end of the connecting rod is pivotally connected to the pump shaft 46. By reason of the symmetrical arrangement of the pump between the bearings, a simple and strong construction is produced.

For the purpose of driving the pump, we provide an electric motor 47 which is mounted upon the frame 22, the drive shaft of the motor being provided with a pulley 48 which in turn drives a pulley 49 through the medium of a belt 50 trained over the two pulleys 48 and 49. A relatively small sprocket wheel 51 is keyed to the pulley 49 as at 52, so as to rotate therewith while the said sprocket and pulley are loosely mounted on the shaft 53 to which a disc 54 and a sprocket wheel 55 are fixed thereto. Journaled in the frame 22 is a shaft 56 which is disposed parallel to the shaft 53 and which shaft carries sprockets 57 and 58 and a pulley wheel 59 all of which are fixed to said shaft. The sprocket wheel 51 drives the larger sprocket 57 by chains 60, while a belt 61 drives the shaft 53 at the required reduced speed. A relatively wide pulley 59 drives the keyed pulley 42 or idler pulley 43 by a belt 62, while an idler wheel 63 is provided for tightening the belt to take up any slack which might be present therein. A connecting rod 65 is pivoted to the disc 54 as at 64, while the said rod is also pivoted to a rack bar 67 as at 66 and which bar is guided in its movements by suitable guides 68 and 69. The rack bar 67 meshes with a pinion 70 keyed on a shaft 71 as shown in Figure 3 of the drawings.

From the description thus far it will be appreciated that the rack bar 67 will reciprocate in an up and down movement and by reason of its meshing engagement with the pinion 70 fixed on the outer end of the shaft 71 journaled the length of the mixing tank, the said shaft 71 will be rotated alternately in opposite directions. Fixed to the shaft 71 along the length thereof and disposed within the tank are a plurality of spaced agitating paddles 72 each of which includes a plurality of radially extending blades 73 having perforations 74 therein. These paddles 72 being fixed to the shaft 71 will rotate in opposite directions to thoroughly agitate the water within the mixing tank to facilitate the absorption of the carbonic gas by the water at a comparatively low pressure. The carbonic gas is fed to the mixing tank through a pipe 76 which enters the bottom of the tank as at 75. The opposite end of the pipe 76 is connected to the fixture at the end of the usual carbonic gas tank as shown in Figure 1 of the drawings. It will be appreciated that as the carbonic gas bubbles pass through the water rising from the bottom of the tank above the surface level of the water, it further facilitates the absorption of the gas by the water.

Having described the manner in which the carbonic gas is introduced into the mixing tank, we shall now proceed to explain the manner in which water is supplied thereto. The water is supplied by connecting the water supply pipe to the connection 77 of the pump 33 as shown by the arrow 78 in Figure 3 of the drawing, while a pipe 79 leads from the outlet side of the pump 33 and is connected to a manifold or connection 80 which enters the mixing tank at 81 and 82 as best seen in Figure 1 of the drawings. In Figure 5 of the drawing a detail sectional view is shown of one of the water inlets in which a water passage or inlet 83 is provided which is covered by a fine wire mesh screen 84 seated by a threaded nipple 85 having threaded connection with the top wall of the mixing tank. It will be evident that as the water is forced through the sieve or screen 84, it enters the interior of the mixing tank in the form of a spray and thus facilitates the further absorption of the carbonic gas by the water contained therein.

The outlet from the tank for facilitating the filling of bottles of the carbonated water is shown by the numeral 86 which represents a control cock, while mounted adjacent the tank is a pressure gage 87, a safety valve 88 being mounted in the tank as well as a water gage 89. The pressure gage of course indicates the amount of pressure within the tank, the safety valve relieves any excess pressure, while the water gage indicates the water level within the tank.

For the purpose of automatically controlling the actuation of the pump by the water level within the mixing tank, we provide a hollow cylindrical vessel 90 which is connected at its bottom through a metal pipe 91 to an L-fitting 92 and thence to the bottom of the mixing tank by a pipe 93. The vessel 90 is fastened to one end of a lever 95 as at 94, the opposite end of the said lever having a counter balance weight 96 mounted thereon. The entire balancing system is free to turn on the axial center indicated by the reference character 97, and it will be understood that as the water within the tank rises to a given level during the actuation of the pump 33, the water in the vessel 90 rises to the same level. When the water level reaches a predetermined point, the weight of the water in the vessel 90 causes the same to drop down, pushing the link 98 which is pivotally connected to the vertical arm of the lever 95 and by reason of the fact that the lever 98 is in turn connected to a second lever 99, the same tends to push a belt shifter 100 toward the right, the said belt shifter being provided with pins 102 whereby the said belt is shifted from the fixed pulley 42 onto the loose or idler pulley 43, thus disconnecting the drive to the pump 33. As the carbonated water is drawn from the tank through the cock 86, and the water level within the tank and the vessel 90 drops, the said vessel becomes lighter until such time as the counter balance weight 96 overbalances the weight of the vessel whereupon the lever 95 is actuated in an opposite manner thus causing the lever 99 to actuate the belt shifter 100 in an opposite direction to slide the belt 62 onto the fixed pulley 42 to again set the pump 33 in motion. Since the vessel 90, lever 95, and pipe 91 swing on the axial center 97, the pipe 91 may be rigid or of metal, thus dispensing with the usual practice of connecting such a vessel by the use of a flexible rubber hose. As the interior of the tank 26 and vessel 90 is filled with gas above the water level, we connect the top of the tank and the vessel by a connecting flexible hose 101.

In operation of the machine the operator admits carbonic gas from the carbonic supply tank to the mixing tank through the pipe 76, and the motor 47 is placed in motion. If desired, an automatic pressure gage (not shown) may be provided for admitting gas up to a given pressure only, so as to prevent the admission of excessive pressure into the mixing tank. By reason of the control of the actuation of the pump by the water level in the mixing tank, the tank cannot be overfilled with water and by this feature the machine will be found to be automatic. Although the pump is thrown out of operation when the water level reaches a predetermined level in the mixing tank, the agitators 72 will continue to rotate in opposite directions to constantly agitate the water to produce a thorough mixing of the carbonic gas and the water.

While we have shown what we deem to be the most desirable embodiment of our invention, it is obvious that many of the details may be varied if desired, and we do not limit ourselves to the exact details shown and to nothing less than the whole of our invention limited only by the appended claims.

What we claim as new is:—

1. In a carbonating machine, a mixing tank, a pump, pump driving means, a rock lever, a balance weight at one end thereof, a hollow vessel on the opposite end of said lever, a rigid pipe connection between said hollow vessel and said tank, means in said pipe connection for permitting said vessel to freely move with said rock lever as the weight of the water in said hollow vessel increases and decreases according to the water level in said tank, and means automatically operable by said lever for controlling the actuation of said pump driving means.

2. In a carbonating machine, a mixing tank, a rock lever, a balance weight at one end thereof, a hollow vessel on the opposite end of said lever, a rigid pipe connection between said hollow vessel and said tank, means in said pipe connection for permitting said vessel to freely move with said rock lever as the weight of the water in said hollow vessel increases and decreases according to the water level in said tank, a pump for pumping water into said tank, a driven pulley operatively connected to said pump, an idler pulley, a drive pulley, a belt passing around said drive pulley and shiftable onto either said driven pulley or said idler pulley, and belt shifting means operable by the actuation of said rock lever for shifting said belt onto either said driven pulley or said idler pulley depending upon the level of water in said tank.

3. In a carbonating machine, a mixing tank, a rock lever, a balance weight at one end thereof, a hollow vessel on the opposite end of said lever, a rigid pipe connection between said hollow vessel and said tank, means in said pipe connection for permitting said vessel to freely move with said rock lever as the weight of the water in said hollow vessel increases and decreases according to the water level in said tank, a pump for pumping water into said tank, a driven pulley operatively connected to said pump, an idler pulley, a drive pulley, a belt passing around said drive pulley and shiftable onto either said driven pulley or said idler pulley, belt shifting means operable by the actuation of said rock lever for shifting said belt onto either said driven pulley or said idler pulley depending upon the level of water in said tank, said belt shifting means including a slide member having spaced pins disposed on opposite sides of said belt and operatively connected to said rock lever by pivotally connected link and lever.

In testimony whereof, we sign our names.
FREDERICK NEUSCHAFER.
HARRY BOTWIN.